A. Parker,
Horse Power.

N° 898.                    Patented Aug. 30, 1838.

UNITED STATES PATENT OFFICE.

AMOS PARKER, OF WINDHAM, MAINE.

ENDLESS-CHAIN HORSE-POWER.

Specification of Letters Patent No. 898, dated August 30, 1838.

*To all whom it may concern:*

Be it known that I, Amos Parker, of Windham, in the county of Cumberland and State of Maine, have invented a new and useful Improvement in Horse-Power for Propelling Machinery; and I do hereby declare that the following is a full and exact description thereof, reference being had to the drawings accompanying and making part of this specification.

Figure 1:
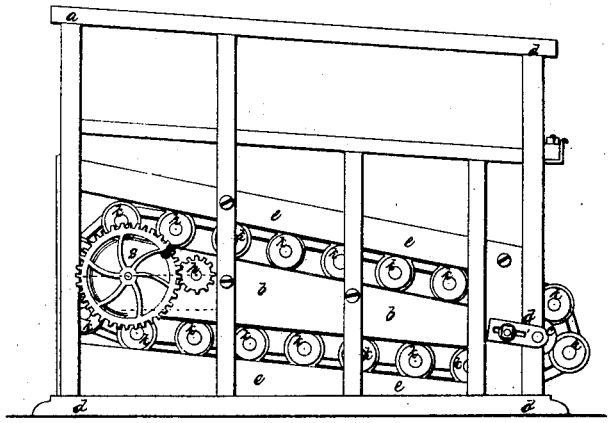
Figure 2:
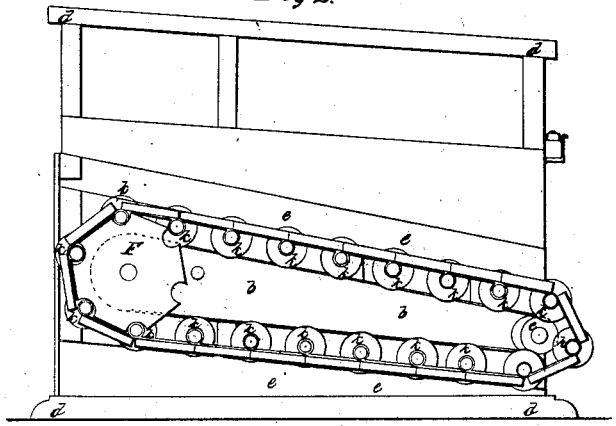
Figure 3:
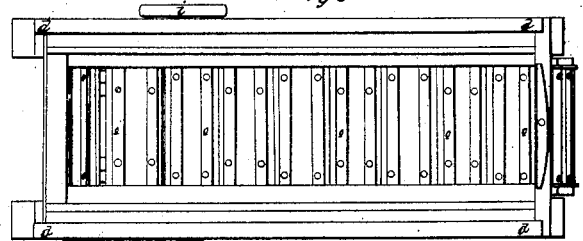
Figure 4:
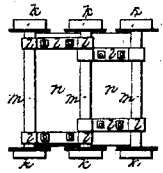

Figure 1 represents a vertical projection: Fig. 2, a longitudinal section; Fig. 3, a top view. Fig. 4 shows the manner of connecting the slats of the endless apron.

$a, a, a, a$, Figs. 1, 2, 3, represent the frame of the machine, which it would be useless to describe in all its parts, as it is constructed in a similar manner to those already in use, and as my only improvement consists in the use of a continuous or circular end railway and in the mode of connecting the slats, which both will be hereafter described. The continuous or circular end railways $b, b$, Figs. 1 and 2, are composed of oblong pieces, made tapering and attached to the inside of each of the side pieces of the frame, the wider ends of which are made round or convex and the narrower concave, so as to admit of the revolution of friction when $c$, Figs. 1 and 2, and those wheels, are connected to each other by a shaft passing from one of the sides of the frame to the other, and running in sliding boxes $d$ attached to the hind posts of the frame, by a bolt passing through them, on one end of which a screw is cut for the purpose of tightening or slackening the endless apron. The circular railway is so attached to the sides of the frame as to gradually slope downward from the front of the machine, and the friction wheels $c$ revolve in a line with and about one half of their circumference in the concavity of the lower or hind end of the oblong piece. Above and below these continuous railways, running parallel with it, and attached to the inside of the sides of the frame, with a sufficient space between them and the continuous railways to admit of the passage of the trucks on the endless apron, are other railways $e, e$, Figs. 1 and 2, the upper inverted and the lower placed in the usual manner.

$f$, Fig. 2, shows a wheel with its shaft passing from one of the side pieces to the other through the oblong pieces, $b, b$, near the wider ends, and running in suitable boxes attached to said sides. On the periphery of this wheel at suitable distances from each other are semicircular grooves which allow the axles of the trucks on the endless apron near their center to work into them, thus in the revolution of the apron giving motion to the wheel. On either end of said shaft may be attached suitable gearing to propel the desired machinery, represented in the drawing as having on one end a cogwheel $g$ working into a pinion $h$, Fig. 1, on the end of another shaft thus giving motion to it and at pulley $i$, Fig. 4, to which the belt may be attached.

The friction trucks $k$, Figs. 1, 2 and 4, revolve two on an axle, one on each end, which axle $m$, Fig. 4, is in length equal to the distance between the outside of the two continuous railways and are connected by double hinged straps $l$, Fig. 4, passing from one axle to the other near their ends and of a length equal to the proposed width of the slats, $n$, and the distance between the semicircular grooves on the periphery of the wheel $f$. To these straps the slats and cleats $o$, Fig. 3, are attached by a bolt $p$ passing through the cleats and straps, and held firmly by a head on one end and a screw on the other.

The advantages arising from my mode of having the endless apron revolve entirely upon a continuous railway and only operating upon the revolving wheel $f$, which is the main object to be acted upon, as the staves of a trundle do upon the teeth of a wheel, are that by having all the friction imparted to the endless apron and railway, the horse power will be more durable.

What I claim as my invention and desire to secure by Letters Patent is—

The combining of the friction wheel $c$ with the oblong piece $b$, one end of which is made convex thus forming a continuous or circular end railway upon which the endless apron revolves independent of all other means as before described.

AMOS PARKER.

Witnesses:
John W. Hubbard,
Jacob B. Mong.